United States Patent [19]
Steigner

[11] Patent Number: 5,868,453
[45] Date of Patent: Feb. 9, 1999

[54] TRUCKBED SECURITY SYSTEM

[76] Inventor: Kevin G. Steigner, 5623 W. Belmont, Glendale, Ariz. 85301

[21] Appl. No.: 625,917

[22] Filed: Apr. 1, 1996

[51] Int. Cl.[6] .......................................... B60P 7/02
[52] U.S. Cl. ................................. 296/100; 296/3
[58] Field of Search .................... 296/100, 37.6, 296/3

[56] References Cited

U.S. PATENT DOCUMENTS

| | | | |
|---|---|---|---|
| 3,913,969 | 10/1975 | Hoch | 296/100 |
| 3,923,334 | 12/1975 | Key | 296/100 X |
| 4,181,351 | 1/1980 | Spanke | 296/100 |
| 4,261,611 | 4/1981 | Barry et al. | 296/100 |
| 4,378,127 | 3/1983 | Rossi, Sr. | 296/3 |
| 5,102,185 | 4/1992 | Lake | 296/100 X |
| 5,104,175 | 4/1992 | Enninga | 296/100 |
| 5,131,712 | 7/1992 | Heinz | 296/100 |
| 5,503,450 | 4/1996 | Miller | 296/100 |
| 5,509,709 | 4/1996 | Carroll | 296/100 X |
| 5,564,773 | 10/1996 | Lapsley et al. | 296/100 |

*Primary Examiner*—Joseph D. Pape
*Attorney, Agent, or Firm*—Martin L. Stoneman

[57] ABSTRACT

This invention provides a truckbed security system which includes a substantially-horizontal platform designed to cover the entire top opening of the cargo bed of a pickup truck, lockably, thereby providing security and protection to the contents within. The horizontal platform is strong and rigid enough to carry a heavy payload and is attached by hinge to the rear of the cargo bed allowing the platform's front end to be raised to a convenient height for providing access to the interior of the cargo bed and the contents within. To raise the platform, there is a hydraulic cylinder operated by an integral hydraulic power unit, powered by the battery of the pickup truck, and operator-controlled with a locking key switch. The top of the platform may be used to carry the payload which would normally be carried within the cargo bed. The platform, when raised hydraulically to a substantial angle, can serve as a dump bed with limited capacity.

19 Claims, 3 Drawing Sheets

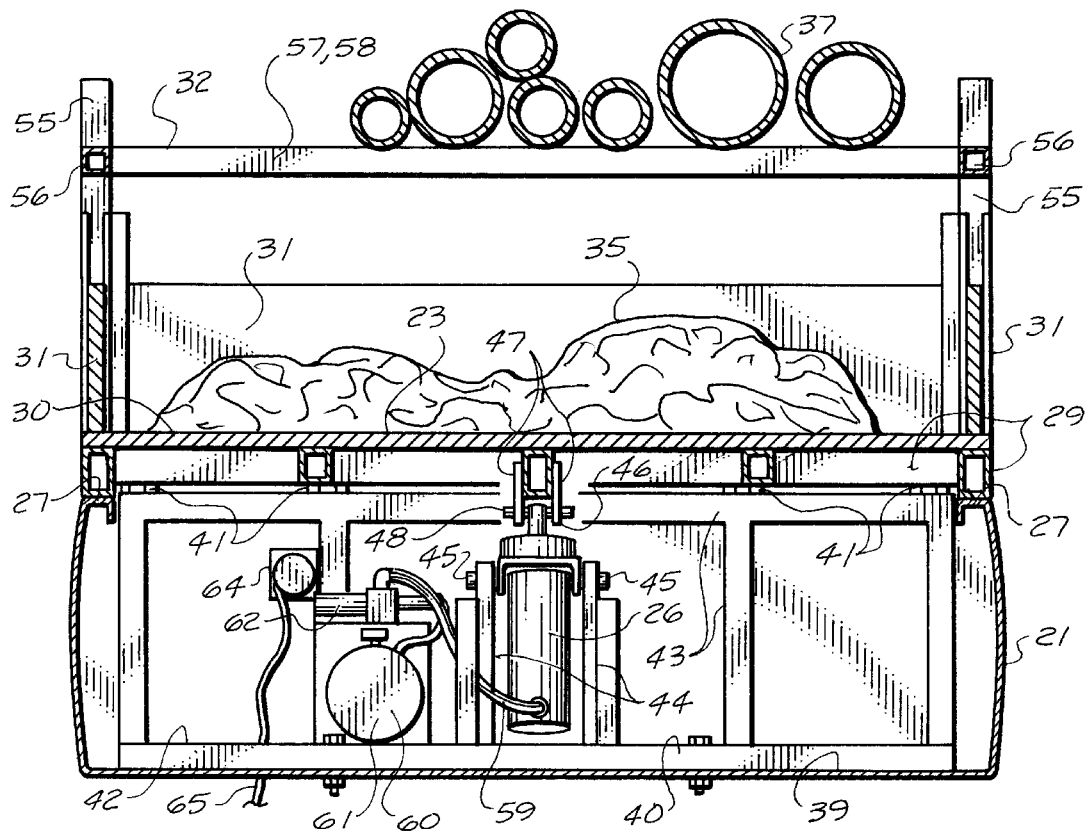
FIG. 5
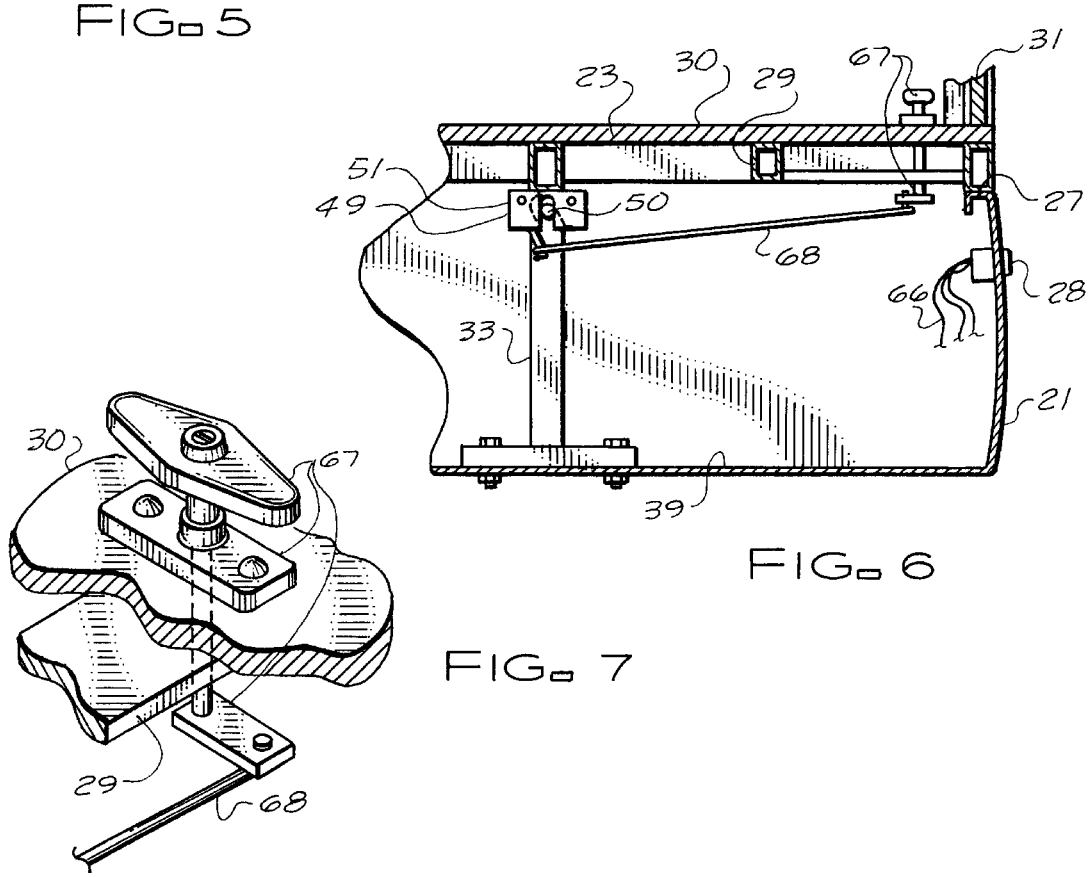
FIG. 6
FIG. 7

TRUCKBED SECURITY SYSTEM

BACKGROUND OF THE INVENTION

1. Field of the Invention

This invention relates to providing a truckbed security system. More particularly, this invention concerns transforming the cargo bed of a pickup truck into a protected and secure area for the storage of valuable tools and the like, while maintaining the full use of the trucks cargo-carrying capacity.

2. Description of the Prior Art

Typically, a driver of a pickup-truck-like vehicle, to protect tools and the like, uses a locking tool box carried in the bed of the truck, often firmly attaching the toolbox to the truck to keep it from being stolen whole. Some workers/drivers even attempt to keep all of their tools in the cab of the truck or provide an in-the-way locking camper shell to try to protect such things as valuable tools from thievery; but such shells vastly increase the difficulty of getting to a tool when it is needed.

Also, typically, to prevent others from viewing tool boxes or other valuable items being hauled in the pickup truck, some workers/drivers use lightweight cargo-bed covers while not actively working in the vicinity; but such covers do not maintain the truck's ability to carry a normal cargo. Thus, there is still a need for a better system, one which enables carrying cargo while protecting tools in a pickup-truck-like vehicle.

OBJECTS OF THE INVENTION

A primary object of the present invention is to fulfill the above-mentioned need by the provision of truckbed security system. A further primary object of the present invention is to provide such a system which is efficient, inexpensive, and handy. In addition, it is a primary object of this invention to provide such a system which is easy to operate, fully protects valuable tools and the like, and greatly expands the uses to which such truck may be put. Other objects of this invention will become apparent with reference to the following invention descriptions.

SUMMARY OF THE INVENTION

According to a preferred embodiment of the present invention, this invention provides, for use with a cargo bed of a pickup truck, such cargo bed being of the type having a top opening entirely above an interior cargo space defined by a front wall and rear wall of such cargo bed and by a pair of side panels having substantially horizontal upper rims, to protect and secure the contents of such interior cargo space, a truckbed security system comprising, in combination: platform means for entirely covering such top opening; along a side of such platform means, hinge means for hingedly securing such platform means to such pickup truck in such manner that, at a first hinge position of such hinge means, such platform means lies in a first position supported on such upper rims, and, at a second hinge position of such hinge means, such platform means lies in a second position permitting access to such interior cargo space; support means for supporting such platform means in such second position; and locking means for locking such platform means in such first position. Further, this invention provides such a truckbed security system wherein such support means comprises fluid cylinder means extendible against a bottom portion of such platform means.

In addition, according to a preferred embodiment thereof, this invention provides such a truckbed security system further comprising power means for raising such platform means from such first position to such second position; and, further, wherein such power means comprises fluid cylinder means extendible against a bottom portion of such platform means. Also, it provides such a truckbed security system further comprising locking switch means for controlling such power means; and, further, wherein such support means comprises such power means. And it also provides such a truckbed security system further comprising rear wall mounting means for attaching such rear wall to such cargo bed; and, further, wherein such hinge means secures such platform means to an upper edge of such rear wall; and, also, further comprising power means for swiveling such platform means upwards about such hinge means. Even further, the present invention provides such a truckbed security system further comprising superstructure means, attached to such platform means, for providing, when such platform means is in such first position, means for carrying a payload above such platform means. And it provides such a truckbed security system further comprising superstructure means, attached to such platform means, for providing, when such platform means is in such second position, means for dumping a payload from above such platform means to a place in back of such rear wall.

Even additionally, in accordance with a preferred embodiment thereof, the present invention provides a truckbed security system comprising, in combination: a pickup-truck-like vehicle having a cargo bed of the type having a top opening entirely above an interior cargo space defined by a front wall of such cargo bed and by a pair of side panels having substantially horizontal upper first rims; rear wall mounting means for attaching a rear wall to such cargo bed at a rearmost portion of such interior cargo space; such rear wall attached at such rearmost portion of such interior cargo space and such rear wall having a substantially horizontal upper second rim lying substantially in a plane defined by such horizontal upper first rims; platform means for entirely covering such top opening; attached at an uppermost portion of such rear wall, hinge means for hingedly securing such platform means to such pickup truck in such manner that, at a first hinge position of such hinge means, such platform means lies in a first position supported on such upper rims, and, at a second hinge position of such hinge means, such platform means lies in a second position permitting access to such interior cargo space; and support means for supporting such platform means in such second position.

Yet further, it provides such a truckbed security system further comprising locking means within such interior cargo space adjacent such front wall for locking such platform means in such first position, such locking means being openable from outside such interior cargo space; and, further, wherein such support means comprises fluid cylinder means extendible between such cargo bed and a bottom portion of such platform means. And it provides such a truckbed security system further comprising power means, within such interior cargo space, for raising such platform means from such first position to such second position; and, further, wherein such power means comprises fluid cylinder means extendible between such cargo bed and a bottom portion of such platform means. Moreover, it provides such a truckbed security system further comprising, mounted on such pickup-truck-like vehicle, locking switch means for controlling such power means from outside such interior cargo space; and, also, further comprising superstructure means, attached to such platform means, for providing, when such platform means is in such first position, means for carrying a payload above such platform means; and, also, further comprising superstructure means, attached to such platform means, for providing, when such platform means is in such second position, means for dumping a payload from above such platform means to a place in back of such pickup-truck-like vehicle.

Even yet additionally, the present invention provides, according to a preferred embodiment thereof, a truckbed security system comprising, in combination: a pickup truck having a cargo bed of the type having a top opening entirely above an interior cargo space defined by a front wall of such cargo bed and by a pair of side panels having substantially horizontal upper first rims; a frame attached to such cargo bed at a rearmost portion of such interior cargo space; a rear wall of such interior cargo space attached to such frame, such rear wall having a substantially horizontal upper second rim lying substantially in a plane defined by such horizontal upper first rims; a platform constructed and arranged to cover such top opening; attached at an uppermost portion of such rear wall, a hinge for hingedly securing such platform to such pickup truck in such manner that, at a first hinge position of such hinge, such platform means lies in a first position supported on such upper first rims, and, at a second hinge position of such hinge, such platform lies in a second position permitting access to such interior cargo space; a hydraulically-operated cylinder extendible between such frame and a bottom portion of such platform for raising; mounted on such pickup truck, a locking switch constructed and arranged for controlling such hydraulically-operated cylinder from outside such interior cargo space; a superstructure frame, attached to such platform, constructed and arranged, when such platform is in such first position, for carrying a payload above such platform; and superstructure means, attached to such platform, for providing, when such platform is in such second position, for the dumping of a such payload from above such platform to a place in back of such pickup truck.

BRIEF DESCRIPTION OF THE DRAWINGS

FIG. 5 is a cross-sectional elevation view, through the section 5—5 of FIG. 2, of a truck bed and the present truckbed security system.

FIG. 6 is a partial cross-sectional view, through the section 6—6 of FIG. 2, of the latch area of the present invention.

FIG. 7 is a perspective partial detail of the latch locking and opening area of the latch area of FIG. 6.

DETAILED DESCRIPTION OF A PREFERRED EMBODIMENT AND THE BEST MODE OF PRACTICE

Generally, the preferred embodiment of the truckbed security system of the present invention includes a substantially-horizontal platform means designed to cover the entire top opening of the cargo bed of a pickup truck, lockably, thereby providing security and protection to the contents within. Additionally, the horizontal platform of this platform means is attached by hinge to the rear of the cargo bed allowing the platform's front end to be raised to a convenient height for providing access to the interior of the cargo bed and the contents within. To raise the platform, a hydraulic cylinder operated by an integral hydraulic power unit is incorporated. The hydraulic power unit is powered by the battery of the pickup truck's electrical system and is operator-controlled with a locking key switch. Additionally the platform incorporates a keyed latch to lock the front of the platform down to the cargo bed thus preventing the platform from being raised manually and providing access to contents stored within. In addition to providing a secured storage system, the "platform", as always used and meant herein, is of a strong and rigid construction, enough to carry a payload which would normally be carried within the cargo bed. And the platform, when raised hydraulically to a substantial angle, can serve as a dump bed.

Figure 1:
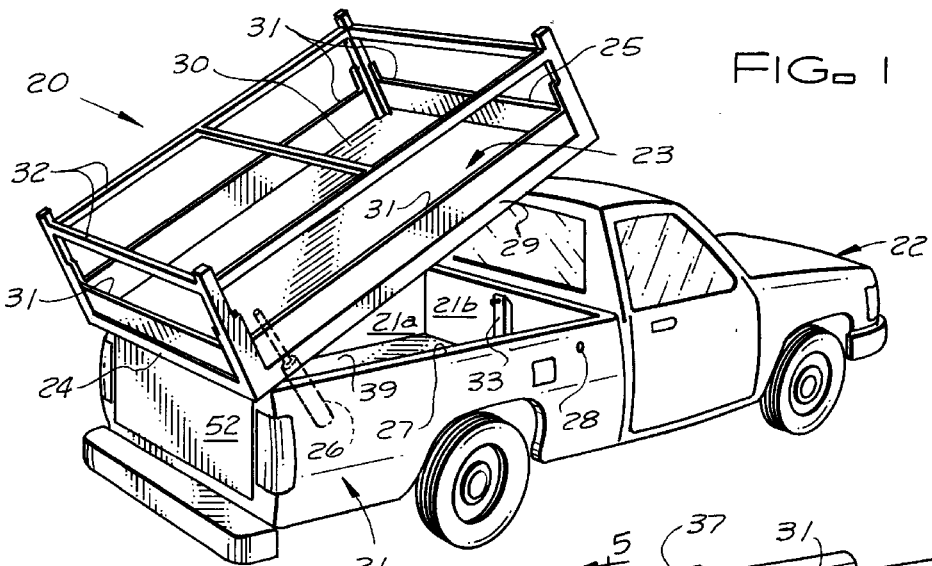
FIG. 1 is a perspective view of a pickup truck incorporating the preferred embodiment of the present truckbed security system, with the platform of the invention shown in a raised position.

Shown in FIG. 1 is the preferred embodiment of a truckbed security system 20 installed on and within the cargo bed 21 of a pickup-truck-like vehicle, embodied by pickup truck 22. The truckbed security system 20 is illustrated with its platform means, embodied by platform 23, raised to its open position, thereby providing access to the interior cargo space (as defined by the interior surfaces of cargo bed side panels 21a, front wall 21b, rear wall 52, and floor 39) of cargo bed 21 and to its contents. The platform 23 is hinged at its rear end 24 allowing its front end 25 to be raised to approximately 30 degrees above horizontal by the extending of a hydraulic cylinder 26. The hydraulic cylinder 26 is powered by a hydraulic power unit, which is operator controlled with a locking key switch 28 conveniently located on the exterior of the cargo bed 21. The platform 23 of the truckbed security system 20 is comprised of a metal (preferably steel) frame 29, a floor 30, and, in a preferred embodiment, platform superstructure means embodied in part by removable partial side and end panels 31 and an integral rack structure 32. When the platform 23 is in the lowered position, it is latched and locked to a pedestal 33 bolted to the floor of the cargo bed 21.

Figure 2:
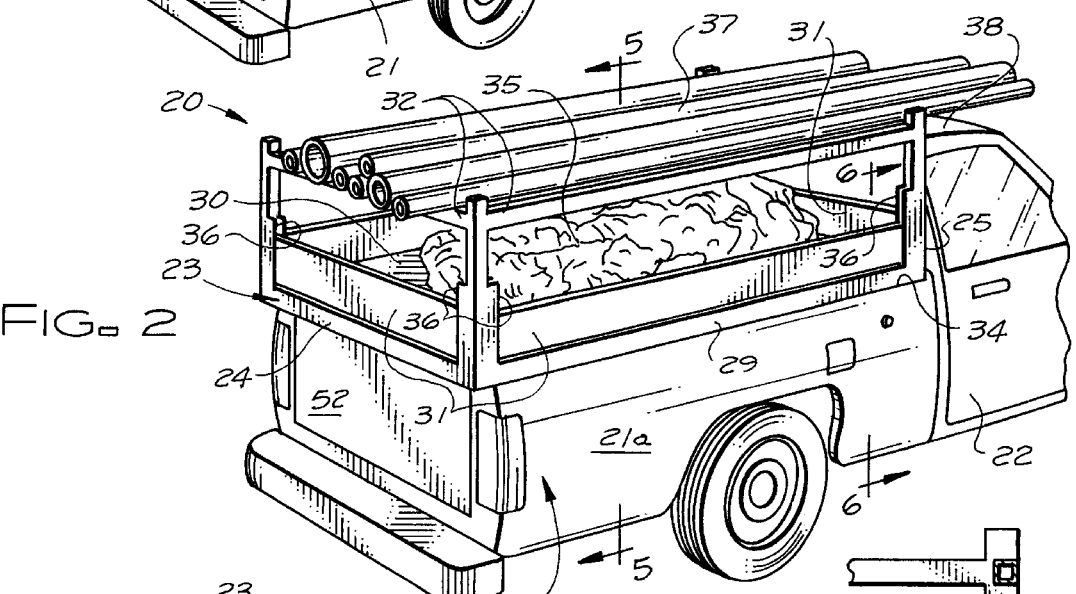
FIG. 2 is as a perspective view of a pickup truck with the present truckbed security system shown in its secured position.

When the platform 23 of the truckbed security system 20 is in the lowered position (as shown in FIG. 2), it renders the contents of the cargo bed 21 inaccessible and secure from theft and vandalism. The length and width of platform 23 is generally the same as the outer length and width of cargo bed 21 and, when platform 23 is lowered, it overlaps and rests upon the front and side portions of the substantially-horizontal perimeter rim 34, including the upper rims 27 of side panels 21a, of cargo bed 21. The rear end 24 of platform 23 is attached by hinge to a sub frame (not shown in FIG. 1) which in turn is bolted to the rear area of the cargo bed 21 floor (not shown). With the front end 25 of platform 23 lowered, latched and locked, the platform 23 can't be raised or lifted upward to gain access to the contents of the cargo bed 21.

As shown in FIG. 2, in addition to securing the contents of the cargo bed 21, the floor 30 of the platform 23 can be used to hold and transport cargo 35. The preferred embodiment of the truckbed security system 20 incorporates side and end panels 31 on platform 23 which install within channels 36 of frame 29 and may be installed and removed at will. Removal of panel 31 at the rear end 24 allows the cargo 35 to be "dumped" when platform 23 is raised. Also included is a superstructure means, embodied by a rack structure 32 extending upward from frame 29, which may be used to hold an additional upper cargo 37. The rack structure 32 extends upward higher than the cab roof 38 of pickup truck 22 so that if the upper cargo 37 is lengthy, it may extend over and above the cab roof 38.

Figure 3:
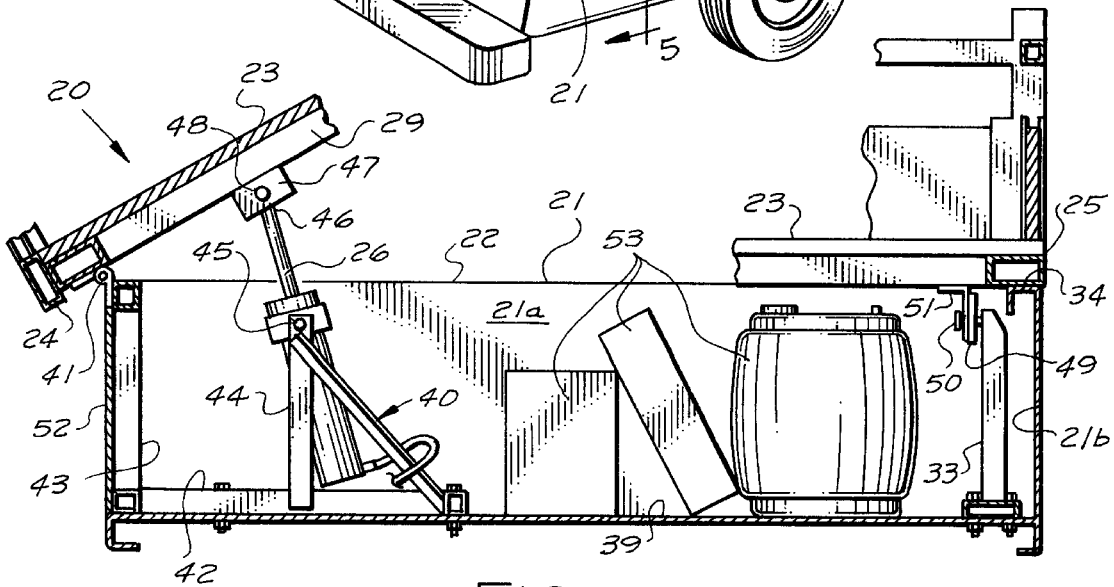
FIG. 3 is a cross-sectional elevation view of a truck bed and the preferred truckbed security system.

FIG. 3 is a cross-sectional longitudinal elevation view of cargo bed 21 of pickup truck 22 with a truckbed security system 20 installed. Bolted to the floor 39 at the rear of the cargo bed 21 is a frame 40 which provides the support and pivotal attachment of the platform 23 at hinges 41. Frame 40 is composed of welded steel members and includes a base structure 42, vertical structure 43 and cylinder mount 44. First plates of hinges 41 are welded to the top of the vertical structure 43 and the opposing plates are welded to frame 29 at the rear end 24 of the platform 23. A hydraulic cylinder 26 is pivotally mounted with trunions 45 to the cylinder mount 44 of frame 40. The rod end 46 of hydraulic cylinder 26 is pivotally attached to clevis plates 47 (attached to frame 29 of platform 23) with clevis pin 48. Additionally, a hydraulic power unit (not shown in FIG. 2) is mounted to base structure 42 of frame 40 for actuating the hydraulic cylinder 26. The hydraulic cylinder 26 is single acting, and upon extension by the hydraulic power unit, raises platform 23. In FIG. 3, the REAR portion of platform 23 is shown in the raised position. Lowering of the platform 23 is by gravity, and is controlled by metering out of the hydraulic fluid from the hydraulic cylinder 26 by the hydraulic power unit. In FIG. 3, The FRONT end 25 of platform 23 is shown in the down position, resting atop the perimeter rim 34 of cargo bed 21.

Securing and locking the platform 23 downward against the cargo bed 21 is latch 49 engaging with pin 50 of pedestal 33. Latch 49 is of the type commonly used with automobile hoods, trunk lids, doors, etc., and self latches when lowered against pin 50. Additionally, latch 49 is mounted to bracket 51, an extension of frame 29, and is manually released by a lockable keyed handle and connecting rod (not shown in FIG. 3). Completing the security provision of the truckbed security system 20 is rear wall 52, which is welded to and a part of the vertical structure 43 of frame 40. Rear wall 52 fills the entire rear opening of cargo bed 21 from side to side and from floor 39 upward to the underside of platform 23. Rear wall 52 replaces the normal tailgate of a pickup truck cargo bed and, unlike a tailgate, can't be unlatched and lowered providing access to the interior of cargo bed 21. Therefore, when platform 23 is lowered, latched and locked, the interior cargo space of cargo bed 21 is not accessible, and secured contents 53 can't be removed.

Figure 4:
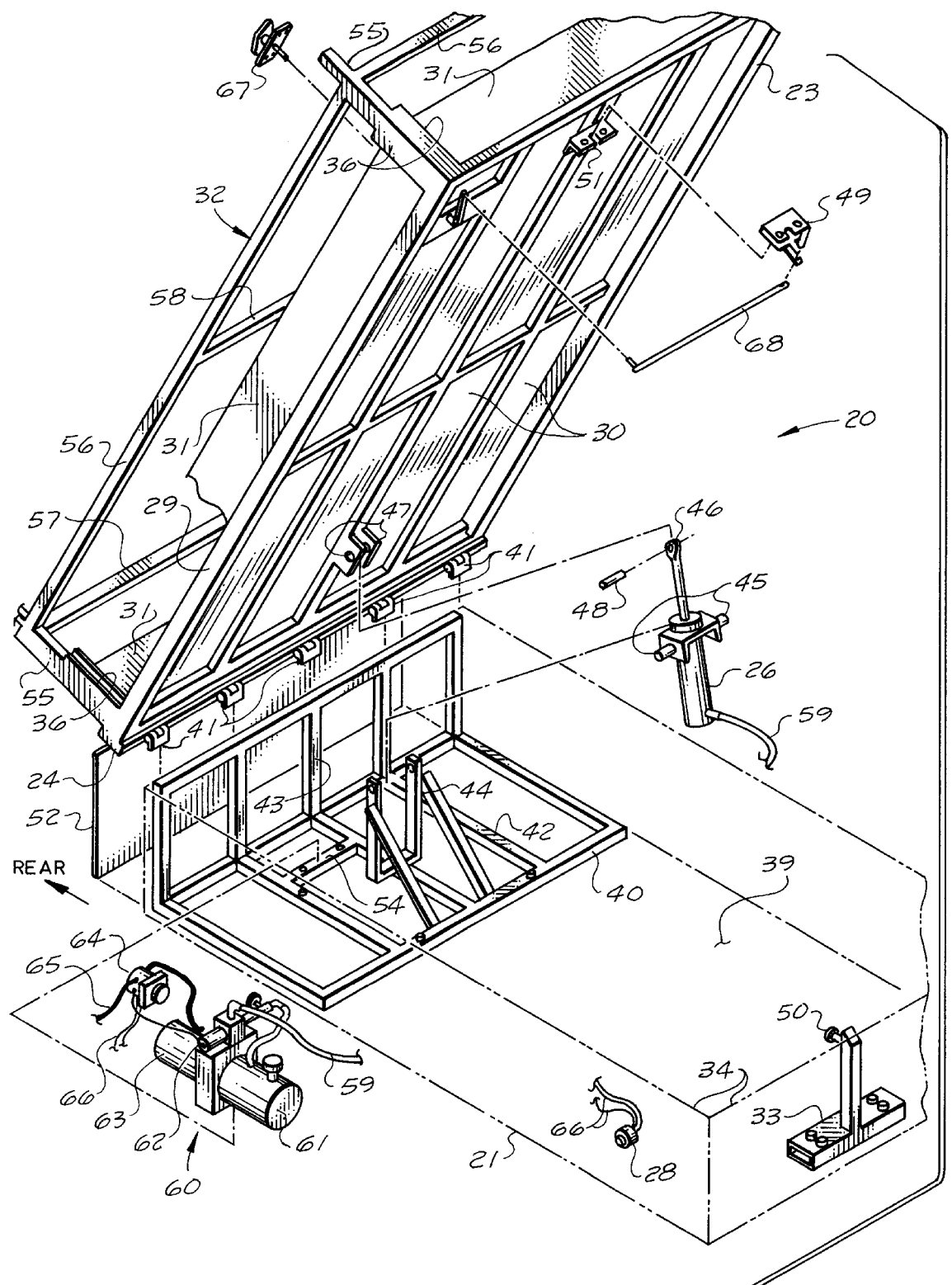
FIG. 4 is a perspective exploded view of a preferred embodiment of the truckbed security system of the present invention.

FIG.4 illustrates in exploded view the components of the truckbed security system 20. Shown by dotted lines is cargo bed 21 of pickup truck 22, identifying its perimeter rim 34 and floor 39. Bolted to floor 39 of cargo bed 21 is pedestal 33 and frame 40. Frame 40 is designed to evenly distribute the weight of platform 23 and it's cargo over a large portion of floor 39. Frame 40 is of welded construction and fabricated generally from square steel tubing. Base structure 42 incorporates a cylinder mount 44 and power unit mount 54. Welded to base structure 42 is vertical structure 43 which supports platform 23 and is rearwardly covered with welded-on rear wall 52. Also welded to vertical structure 43, at its top rearward facing surface, are the first set of hinge plates of hinges 41, the second set of hinge plates of hinges 41 being welded to the underside of platform 23, at the rear end 24 of frame 29 (in a well-known manner for such hinges).

Platform 23 consists of frame 29 with rack structure 32, floor 30 and removable side and end panels 31. Frame 29 is preferably a welded fabrication containing longitudinal and latitudinal members which are rectangular steel tubing and form a grid pattern to evenly support the floor 30. Floor 30 is preferably wood with thickness suitable for its application. Welded to the top surface of frame 29 at each corner and extending upward vertically are steel posts 55 which include channels 36, which are receptacles for side and end panels 31. Welded to, and interconnecting with posts 55 near their upward ends, as shown, are steel rails 56 over the front and both sides of cargo bed 21. Welded between, and connecting rails 56 on either side, at midpoint and perpendicular to the sides of platform 23, as shown, is center rail 58. Bolted to, and connecting rear posts 55 at the same elevation as rails 56 and 58, as shown, is rear rail 57 which is preferably steel, and removable for convenience with varying types of cargo. Side and end panels 31 are preferably wood and also removable from channels 36 as a convenience for handling varying cargo. Panel 31 at rear end 24 may be removed to allow cargo (such as cargo 35) to slide from floor 30 of platform 23 if dumping is desired.

The central longitudinal member of frame 29, as shown, includes clevis plates 47 to receive clevis pin 48 for attachment of cylinder rod end 46 of hydraulic cylinder 26. Additionally, the hydraulic cylinder 26 is mounted to cylinder mount 44 of frame 40 at trunions 45 for self aligning of the hydraulic cylinder 26 as geometry changes during raising and lowering of platform 23 (in well known ways). Hydraulic cylinder 26 is hydraulically interconnected by flexible hose 59 to hydraulic power unit 60 which is mounted on and bolted to power unit mount 54. The hydraulic power unit 60 is a self contained unit containing a pump within a fluid reservoir 61, solenoid valve 62, and valving with interconnecting plumbing to provide the required functioning. The hydraulic power unit 60 includes and is powered by electric motor 63. Solenoid relay 64, located on frame 40, controls electrical current transmitted through battery cable 65 from the pickup truck's battery. Control of solenoid relay 64 is through electrical wiring 66 by locking key switch 28 mounted to cargo bed 21. When platform 23 is in the lowered position, it latches to pin 50 of pedestal 33 with latch 49. Latch 49 mounts to bracket 51 of platform 23 and is interconnected to keyed handle 67 by connecting rod 68. Latch 49 and related components are described in detail in FIG. 6.

FIG. 5 is a cross-sectional elevation view through section 5—5 of FIG. 2. Shown in cross section is frame 29 of platform 23 shown resting atop upper rims 27 of perimeter rim 34 of cargo bed 21. Platform 23 includes floor 30, side panels 31, rack structure 32 consisting of posts 55 and rails 56, 57 and 58. Also shown is cargo 35 and upper cargo 37. Mounted in floor 39 of cargo bed 21 is frame 40 consisting of base structure 42, vertical structure 43 and cylinder mount 44. Platform 23 is attached to frame 40 at hinges 41 and further connected by hydraulic cylinder 26 rod end 46 at clevis plates 47 by clevis pin 48 and at cylinder mount 44 with trunions 45. Also shown is hose 59 and hydraulic power unit 60 with pump/reservoir 61 and solenoid valve 62. Battery cable 65 from solenoid relay 64 to the pickup truck's battery is shown exiting through floor 39 of cargo bed 21.

FIG. 6 is a partial cross-sectional view, through the section 6—6 of FIG. 2, of the latch area of the present invention, showing the manner of interconnection keyed handle 67 and connecting rod 68 with latch 49. The latch pin 50 and the connecting bracket 51 for latch 49 are also shown, as is pedestal 33, upon which pin 50 is mounted. FIG. 7 is a perspective partial detail of the latch locking and opening area of the latch area of FIG. 6, further illustrating the detailed manner of interconnection of keyed handle 67 with connecting rod 68.

The described hydraulic unit embodies both a power means for raising the platform means and a support means for supporting it in its open position. The described latch embodies a locking means for locking the platform means in its closed position. And the fluid cylinder means of this invention is embodied by the described hydraulic unit. And the locking switch means of the invention is embodied by the described locking key switch. And the rear wall mounting means for attaching rear wall 52 to cargo bed 21 is embodied by frame 40 and vertical structure 43. And the described superstructure connected above platform 23 embodies the superstructure means of this invention.

Although applicant has described applicant's preferred embodiments of this invention, it will be understood that the broadest scope of this invention includes such modifications as diverse shapes and sizes and materials. Such scope is limited only by the below claims as read in connection with the above specification.

What is claimed is:

1. For use with a cargo bed of a pickup truck, said cargo bed being of the type having a top opening entirely above an interior cargo space defined by a front wall and rear wall of said cargo bed and by a pair of side panels having substantially horizontal upper rims, to protect and secure the contents of said interior cargo space, a truckbed security system comprising, in combination:
   a. horizontal platform means for entirely covering said top opening, said platform means being constructed and arranged for lying substantially in a plane defined by said horizontal upper rims and for the bearing of substantial loads;
   b. for location along a side of said platform means, hinge means for hingedly securing said platform means to said pickup truck in such manner that, at a first hinge position of said hinge means, said platform means lies in a first position supported on said upper rims, and, at a second hinge position of said hinge means, said platform means lies in a second position permitting access to said interior cargo space;
   c. support means for supporting said platform means in said second position;
   d. locking means for locking said platform means in said first position; and
   e. rear wall mounting means for immovably attaching a fixed rear wall for said interior cargo space to said cargo bed.

2. A truckbed security system according to claim 1 wherein:
   a. said support means comprises fluid cylinder means constructed and arranged for location within said interior cargo space and extendible against a bottom portion of said platform means.

3. A truckbed security system according to claim 1 further comprising:
   a. power means for independently, without user assistance, raising said platform means from said first position to said second position.

4. A truckbed security system according to claim 3 wherein:
   a. said power means comprises fluid cylinder means constructed and arranged for location within said interior cargo space and extendible against a bottom portion of said platform means.

5. A truckbed security system according to claim 3 further comprising:
   a. locking switch means for controlling said power means.

6. A truckbed security system according to claim 4 wherein said support means comprises said power means.

7. A truckbed security system according to claim 1 wherein:
   b. said hinge means is constructed and arranged for attachment to an upper edge of a said fixed rear wall and for securing said platform means to said upper edge of said fixed rear wall.

8. A truckbed security system according to claim 7 further comprising:
   a. power means, located within said interior cargo space, for swiveling said platform means upwards about said hinge means in such a manner as to tend to dump rearward any loose load being borne by said platform means.

9. A truckbed security system according to claim 1 further comprising:
   a. superstructure means, attached to said platform means, for providing, when said platform means is in said first position, means for carrying a payload above said platform means.

10. For use with a cargo bed of a pickup truck, said cargo bed being of the type having a top opening entirely above and interior cargo space defined by a front wall and rear wall of said cargo bed and by a pair of side panels having substantially horizontal upper rims, to protect and secure the contents of said interior cargo space, a truckbed security system comprising, in combination:
    a. platform means for entirely covering said top opening;
    b. along a side of said platform means, hinge means for hingedly securing said platform means to said pickup truck in such manner that, at a first hinge position of said hinge means, said platform means lies in a first position supported on said upper rims, and, at a second hinge position of said hinge means, said platform means lies in a second position permitting access to said interior cargo space;
    c. support means for supporting said platform means in said second position;
    d. locking means for locking said platform means in said first position; and
    e. superstructure means, attached to said platform means, for providing, when said platform means is in said second position, means for dumping a payload from above said platform means to place in back of said rear wall.

11. A truckbed security system comprising, in combination:
    a. a pickup-truck-like vehicle having a cargo bed of the type having a top opening entirely above an interior cargo space defined by a front wall of said cargo bed and by a pair of side panels having substantially horizontal upper first rims;
    b. a rear wall for said cargo bed and for further defining said interior cargo space;
    c. rear wall mounting means for fixedly attaching said rear wall to said cargo bed at a rearmost portion of said interior cargo space as a fixed rear wall;
    d. said fixed rear wall being attached at said rearmost portion of said interior cargo space and said fixed rear wall having a substantially horizontal upper second rim lying substantially in a plane defined by said horizontal upper first rims;
    e. horizontal platform means for entirely covering said top opening, said platform means being constructed and arranged for lying substantially in a plane defined by said horizontal upper first rims and for the bearing of substantial loads;
    f. attached at an uppermost portion of said fixed rear wall, hinge means for hingedly securing said platform means to said pickup truck in such manner that, at a first hinge position of said hinge means, said platform means lies in a first position supported on said upper rims, and, at a second hinge position of said hinge means, said platform means lies in a second position permitting access to said interior cargo space; and g. support means for supporting said platform means in said second position.

12. A truckbed security system according to claim 11 further comprising:

a. locking means within said interior cargo space adjacent said front wall for locking said platform means in said first position, said locking means being openable from outside said interior cargo space.

13. A truckbed security system according to claim 11 wherein:

a. said support means comprises fluid cylinder means extendible between said cargo bed and a bottom portion of said platform means.

14. A truckbed security system according to claim 11 further comprising:

a. power means, within said interior cargo space, for raising said platform means from said first position to said second position.

15. A truckbed security system according to claim 14 wherein:

a. said power means comprises fluid cylinder means extendible between said cargo bed and a bottom portion of said platform means.

16. A truckbed security system according to claim 14 further comprising:

a. mounted on said pickup-truck-like vehicle, locking switch means for controlling said power means from outside said interior cargo space.

17. A truckbed security system comprising, in combination:

a. a pickup-truck-like vehicle having a cargo bed of the type having a top opening entirely above an interior cargo space defined by a front wall of said cargo bed and by a pair of side panels having substantially horizontal upper first rims;

b. rear wall mounting means for attaching a rear wall to said cargo bed at a rearmost portion of said interior cargo space;

c. said rear wall attached at said rearmost portion of said interior cargo space and said rear wall having a substantially horizontal upper second rim lying substantially in a plane defined by said horizontal upper first rims;

d. platform means for entirely covering said top opening;

e. attached at an uppermost portion of said rear wall, hinge means for hingedly securing said platform means to said pickup truck in such manner that, at first hinge position of said hinge means, said platform means lies in a first position supported on said upper rims, and, at a second hinge position of said hinge means, said platform means lies in a second position permitting access to said interior cargo space;

f. support means for supporting said platform means in said second position; and g. superstructure means, attached to said platform means, for providing, when said platform means is in said first position, means for carrying a payload above said platform means.

18. A truckbed security system comprising, in combination:

a. a pickup-truck-like vehicle having a cargo bed of the type having a top opening entirely above an interior cargo space defined by a front wall of said cargo bed and by a pair of side panels having substantially horizontal upper first rims;

b. rear wall mounting means for attaching a rear wall to said cargo bed at a rearmost portion of said interior cargo space;

c. said rear wall attached at said rearmost portion of said interior cargo space and said rear wall having a substantially horizontal upper second rim lying substantially in a plane defined by said horizontal upper first rims;

d. platform means for entirely covering said top opening;

e. attached at an uppermost portion of said rear wall, hinge means for hingedly securing said platform means to said pickup truck in such manner that, at a first hinge position of said hinge means, said platform means lies in a first position supported on said upper rims, and, at a second hinge position of said hinge means, said platform means lies in a second position permitting access to said interior cargo space;

f. support means for supporting said platform means in said second position; and g. superstructure means, attached to said platform means, for providing, when said platform means is in said second position, means for dumping a payload above said platform means to a place in back of said pickup-truck-like vehicle.

19. A truckbed security system comprising, in combination:

a. a pickup truck having a cargo bed of the type having a top opening entirely above an interior cargo space defined by a front wall of said cargo bed and by a pair of side panels having substantially horizontal upper first rims;

b. a frame attached to said cargo bed at a rearmost portion of said interior cargo space;

c. a rear wall of said interior cargo space attached to said frame, said rear wall having a substantially horizontal upper second rim lying substantially in a plane defined by said horizontal upper first rims;

d. a platform constructed and arranged to cover said top opening;

e. attached at an uppermost portion of said rear wall, a hinge for hingedly securing said platform to said pickup truck in such manner that, at a first hinge position of said hinge, said platform means lies in a first position supported on said upper first rims, and, at a second hinge position of said hinge, said platform lies in a second position permitting access to said interior cargo space;

f. a hydraulically-operated cylinder extendible between said frame and a bottom portion of said platform constructed and arranged for raising said platform from said first position to said second position;

g. mounted on said pickup truck, a locking switch constructed and arranged for controlling said hydraulically-operated cylinder from outside said interior cargo space;

h. a superstructure frame, attached to said platform, constructed and arranged, when said platform is in said first position, for carrying a payload above said platform; and i. superstructure means, attached to said platform, for providing, when said platform is in said second position, for the dumping of a said payload from above said platform to a place in back of said pickup truck.

* * * * *